Figure 1:
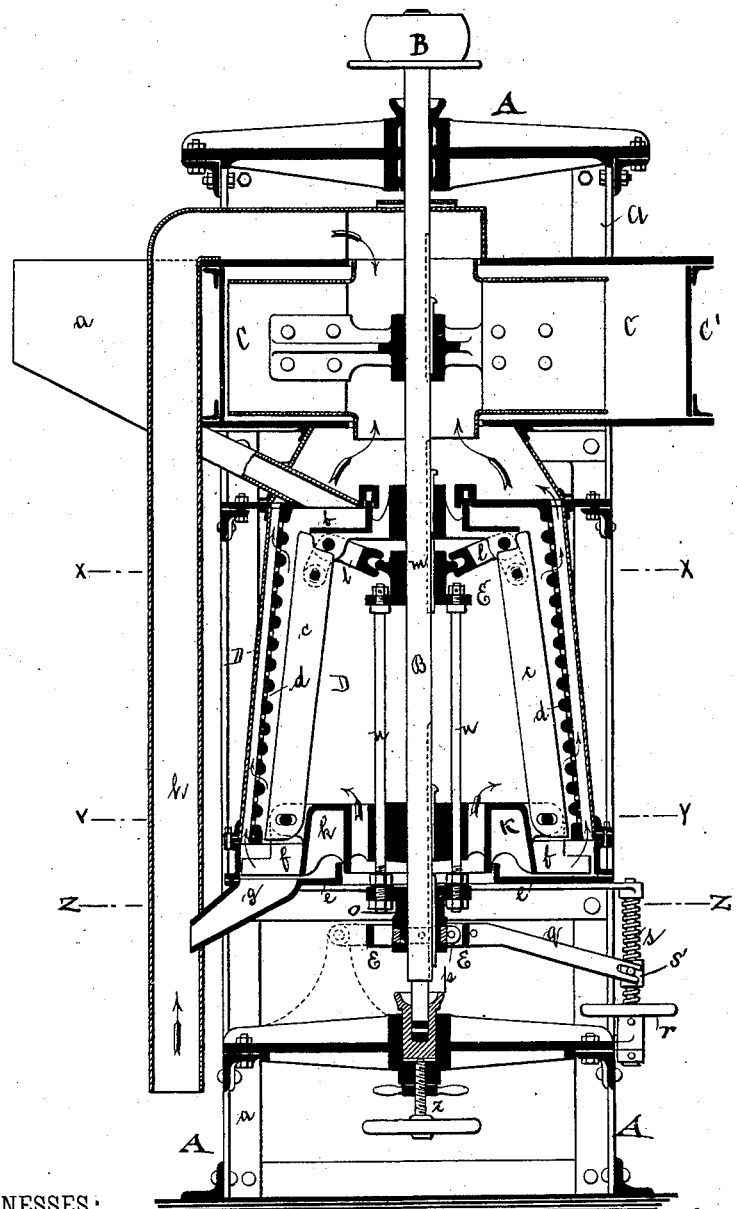

(No Model.) 2 Sheets—Sheet 2.
J. SCHULTZ.
COFFEE HULLING MACHINE.
No. 312,767. Patented Feb. 24, 1885.
fig. 2.
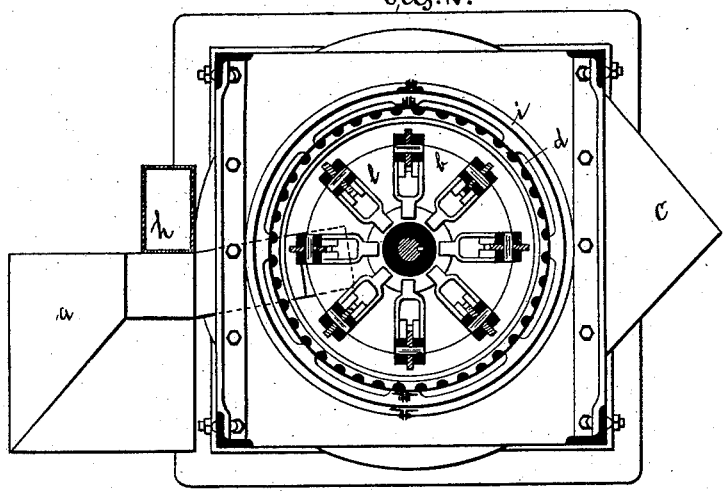
fig. 5. fig. 3. fig. 6.
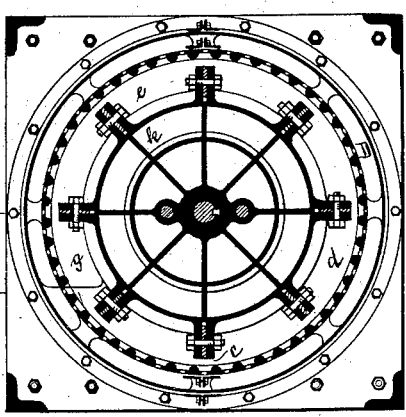 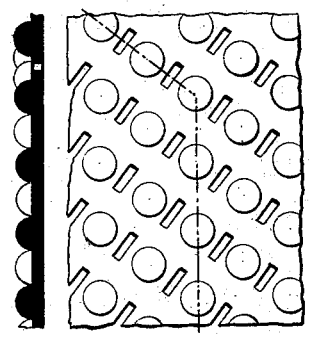
fig. 4.
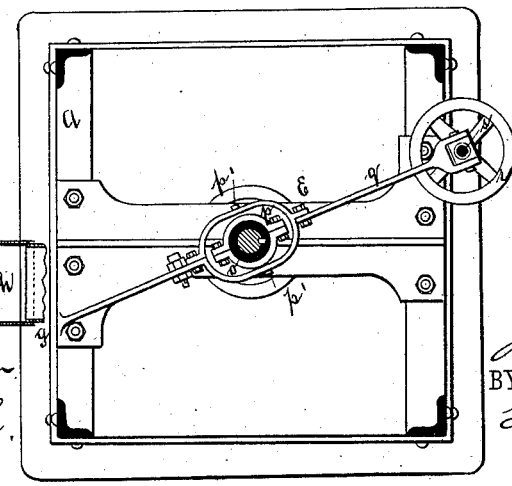
WITNESSES: INVENTOR
Jul. N. Rosenbaum Julius Schultz
Otto Risch. BY Goepel & Raegener
ATTORNEYS.

UNITED STATES PATENT OFFICE.

JULIUS SCHULTZ, OF HAMBURG, GERMANY.

COFFEE-HULLING MACHINE.

SPECIFICATION forming part of Letters Patent No. 312,767, dated February 24, 1885.

Application filed July 3, 1884. (No model.)

*To all whom it may concern:*

Be it known that I, JULIUS SCHULTZ, of Hamburg, in the Empire of Germany, have invented certain new and useful Improvements in Coffee-Hulling Machines, of which the following is a specification.

This invention relates to an improved centrifugal machine for cleaning coffee and other beans, by which they can be cleaned without injuring or discoloring them, and by which the special screening of the coffee-beans, so as to separate them from the shells, skins, and other impurities, is dispensed with.

The invention consists of a centrifugal machine composed of a fixed exterior conical drum, a fixed interior screen having convex projections and intermediate slots or holes, and rotating beaters that can be adjusted by connecting lever mechanism to different inclinations from the outside of the machine. The cleaned beans are collected at the bottom of the drum and conveyed by radial scrapers to a discharge-spout. The husks and lighter particles are separated from the beans by a draft established by a suction-fan above the drum, said suction-fan being connected with the space between the exterior drum and the screen, and with an air-trunk, into which extends the discharge-spout at the lower part of the drum.

In the accompanying drawings, Figure 1 represents a vertical central section of my improved centrifugal machine for cleaning coffee and other beans. Fig. 2 is a horizontal section on line $xx$, Fig. 1, looking upward. Figs. 3 and 4 are horizontal sections, respectively, on lines $yy$ and $zz$, Fig. 1; and Figs. 5 and 6 are detail views and sections of portions of the interior perforated screen.

Similar letters of reference indicate corresponding parts.

Referring to the drawings, A represents the supporting-frame of my centrifugal machine for cleaning coffee and other beans. The frame A is made of wrought-iron, the uprights of which are connected at their upper and lower ends by strong transverse pieces, as shown in Figs. 1 and 4.

B is a vertical shaft that turns in step and neck bearings of the supporting-frame A, said shaft being provided at the upper end with a pulley for the driving-belt. The wings of a suction-fan, C, are secured to the upper part of the vertical shaft B. Below the same are arranged on the shaft B a series of inclined beaters, $c c$, which rotate within a fixed conical drum, D, of suitable sheet metal, said drum communicating at the upper end with an opening in the fan-casing C. The bottom of the drum D is provided with a discharge-spout, $g$.

At a suitable distance from the exterior drum, D, is arranged a fixed interior screen, $d$, of conical shape and concentric to the exterior drum, D. The screen $d$ is provided at its inner surface with convex projections and intermediate slots or openings, as shown clearly in Figs. 1, 5, and 6. The slots or holes are of such a size that they just admit the passage of the coffee-beans after they have been separated from their husks or shells. The object of this arrangement is to facilitate the effective working of the machine, as thereby the beans are conducted through the openings of the screen into the annular space between the drum D and screen $d$, and removed from the action of the rotating beaters, so that the breaking or cracking of the beans is prevented. As the convex projections are arranged in alternating rows or lines, the beans are passed gradually in a zigzag line between them to the lower part of the screen, they being exposed during this motion to the action of the beaters until they are freed of all husks and enabled to pass through the openings of the screen, so as to be collected on the bottom of the drum. The beans are fed to the interior of the screen $d$ by means of a hopper, $a$, which is located sidewise of the suction-fan, and which conveys the beans to a horizontal distributing-disk, $b$, from which they are dropped into the path of the rapidly-rotating beaters $c c$. The beans, whether they pass through the screen or not, are collected at the bottom of the exterior drum, D, and are conducted by scrapers or sweepers $ff$, attached to the beater-supporting frame $k$, to the discharge-spout $g$. This spout opens into an upwardly-extending air-trunk, $h$, that is connected with an opening of the fan-casing C, so that the beans, as they pass from the spout $g$, are exposed to the action of a strong current of air, which separates the husks and other impurities and carries them in upward direction through the fan to the outside, while the cleaned beans are dropped through the lower part of the trunk $h$ and are collected in a suitable receptacle. The lighter particles of the shells or husks that are separated by the action of the beaters and screen from the beans are acted upon by an air-current that is drawn by the fan through a central opening in the drum-bottom, and through the perforations or holes of the screen and the space between the same and the drum D into the fan-casing and from the same to the outside.

To properly adjust the cleaning-machine to different sizes and qualities of beans, it is necessary that the angle of inclination of the beaters to the screen, as well as the distance of the beaters from the screen, should be capable of adjustment. The latter is accomplished by means of the set-screw Z of the step-bearing of the shaft B, while the former is accomplished by the adjusting mechanism E, by which the position of the beaters can be changed during the motion of the machine. The beaters $c\ c$ are pivoted at their lower ends to ears of the supporting-frame $k$, and the upper ends to elbow-levers $l$, that are fulcrumed to the under side of the distributing-disk $b$. The inner ends of the elbow-levers $l$ are fork-shaped and connected to an annular rounded-off sleeve, $m$, that is placed loosely on the vertical shaft B. The sleeve $m$ is connected by vertical screw-rods $n\ n$ with a second sleeve, $o$, that is arranged on the shaft B below the bottom of the drum D, said rods $n\ n$ passing through openings of the beater-supporting frame to the outside. A split ring, $p$, which is screwed together and retained in a groove of the sleeve $o$, is provided at diametrically-opposite points with pivots $p'$, that are engaged by the middle forked part of a lever, $q$, that is pivoted at its rear end to a fixed arm of the supporting-frame A, and connected by a fork at its front end with pivots of a screw-nut, $s'$, that is moved up or down by turning a vertical screw-bolt, $s$, having a hand-wheel, $r$, as shown clearly in Figs. 1 and 4. The vertical up-and-down motion of the screw-nut $s$ is transmitted by the lever $q$, sleeve $o$, rods $n\ n$, sleeve $m$, and fulcrumed elbow-levers $l\ l$ to the upper ends of the beaters $c\ c$, so that the latter can thereby be adjusted to the required degrees of inclination toward the conical screen $d$.

When it is desired to adjust the beaters $c\ c$ nearer to or farther away from the conical screen $d$, the rotary shaft B is raised or lowered by raising or lowering the step-bearing of the same by a screw, Z, having a hand-wheel and jam-nut, as shown in Fig. 1.

Having thus described my invention, I claim as new and desire to secure by Letters Patent—

1. The combination of a fixed exterior drum, a suction-fan arranged above the same and communicating therewith, an interior concentric screen provided at its inner side with convex projections and intermediate slots or holes, rotating beaters, and means, substantially as described, whereby the beaters may be adjusted to different inclinations toward the interior screen, substantially as set forth.

2. In a centrifugal machine for cleaning coffee and other beans, the combination of the fixed exterior drum, a fixed interior screen having convex projections and intermediate slots or holes, rotating beaters, and means whereby the beaters are adjusted to different angles of inclination toward the screen, substantially as set forth.

3. The combination of the exterior drum, D, distributing-disk $b$, interior screen, $d$, having convex projections and intermediate slots, supporting-frame $k$, rotating beaters $c\ c$, pivoted to the said frame, fulcrumed elbow-levers $l\ l$, sleeve $m$, rods $n\ n$, sleeve $o$, having ring $p$, forked lever $q$, screw-nut $a'$, and adjusting screw-bolt $s$, substantially as set forth.

In testimony that I claim the foregoing as my invention I have signed my name in presence of two subscribing witnesses.

JULIUS SCHULTZ.

Witnesses:
MARSHALL VAUGHAN,
H. SCHRODER.